(12) United States Patent
Hartung

(10) Patent No.: US 11,687,897 B2
(45) Date of Patent: Jun. 27, 2023

(54) CARDLESS FINANCIAL TRANSACTIONS

(71) Applicant: Douglas Kurt Hartung, Kingwood, TX (US)

(72) Inventor: Douglas Kurt Hartung, Kingwood, TX (US)

(73) Assignee: Diebold Nixdorf, Incorporated, Hudson, OH (US)

(*) Notice: Subject to any disclaimer, the term of this patent is extended or adjusted under 35 U.S.C. 154(b) by 954 days.

(21) Appl. No.: 15/309,757

(22) PCT Filed: May 11, 2015

(86) PCT No.: PCT/US2015/030174
§ 371 (c)(1),
(2) Date: Nov. 8, 2016

(87) PCT Pub. No.: WO2015/172150
PCT Pub. Date: Nov. 12, 2015

(65) Prior Publication Data
US 2017/0262823 A1    Sep. 14, 2017

Related U.S. Application Data

(60) Provisional application No. 61/990,946, filed on May 9, 2014.

(51) Int. Cl.
*G06Q 20/10* (2012.01)
*G07F 19/00* (2006.01)
(Continued)

(52) U.S. Cl.
CPC ..... *G06Q 20/1085* (2013.01); *G06Q 20/3221* (2013.01); *G06Q 20/3223* (2013.01);
(Continued)

(58) Field of Classification Search
CPC .......... G06Q 20/1085; G06Q 20/3221; G06Q 20/3223; G06Q 20/3274; G06Q 20/385;
(Continued)

(56) References Cited

U.S. PATENT DOCUMENTS 6,045,039 A * 4/2000 Stinson ................. G06Q 20/18
                                                                        235/379
6,155,484 A    12/2000 Sasaki
(Continued)

FOREIGN PATENT DOCUMENTS

EP     2587432 A1      5/2013
EP     2688026 A1 *    1/2014   ............. G06Q 20/10
(Continued)

OTHER PUBLICATIONS

International Search Report for corresponding PCT application, dated Aug. 7, 2015.
(Continued)

*Primary Examiner* — Kenneth Bartley
(74) *Attorney, Agent, or Firm* — Black, McCuskey, Souers & Arbaugh LPA

(57) ABSTRACT

An automatic-transaction-machine (ATM) has a processor that controls at least portions of some financial transactions conducted by the ATM. A banking computer system associated with the ATM is receives a pre-created transaction request from a customer using a mobile device. When the customer later brings the mobile device to the ATM, the ATM presents transaction-verification data to be received by the mobile device. The ATM is configured to receive mobile-verification data back from the mobile device that is responsive to the transaction-verification data. When the mobile-verification data is authenticated by the banking computer system the ATM is configured to execute the pre-created transaction request.

1 Claim, 4 Drawing Sheets

(51) Int. Cl.
  *G06Q 20/40* (2012.01)
  *G06Q 20/32* (2012.01)
  *G06Q 20/38* (2012.01)

(52) U.S. Cl.
  CPC ....... *G06Q 20/3274* (2013.01); *G06Q 20/385* (2013.01); *G06Q 20/4014* (2013.01); *G07F 19/20* (2013.01); *G07F 19/203* (2013.01)

(58) Field of Classification Search
  CPC .. G06Q 20/401; G06Q 20/4014; G06Q 21/10; G06Q 20/40; G06Q 20/32; G06Q 20/38; G07F 19/20; G07F 19/203; G07F 19/00
  USPC .............................................. 705/43; 235/379
  See application file for complete search history.

(56) References Cited

U.S. PATENT DOCUMENTS

| | | | |
|---|---|---|---|
| 7,689,508 B2 | 3/2010 | Davis et al. | |
| 7,890,422 B1 | 2/2011 | Hirka et al. | |
| 8,452,257 B2 | 5/2013 | Granucci et al. | |
| 8,639,621 B1 * | 1/2014 | Ellis ................... | G06Q 30/0267 |
| | | | 705/41 |
| 8,751,239 B2 | 6/2014 | Tian et al. | |
| 8,751,313 B2 | 6/2014 | Fisher | |
| 8,751,391 B2 | 6/2014 | Freund | |
| 8,960,537 B2 | 2/2015 | Bulawa et al. | |
| 9,014,662 B1 | 4/2015 | Gailloux et al. | |
| 9,026,459 B2 | 5/2015 | Fisher | |
| 10,223,678 B2 * | 3/2019 | Park ....................... | G06F 3/0488 |
| 2003/0028481 A1 * | 2/2003 | Flitcroft ................. | G07F 19/00 |
| | | | 705/39 |
| 2006/0180654 A1 * | 8/2006 | Meek .................... | G06Q 20/105 |
| | | | 235/379 |
| 2008/0126145 A1 | 5/2008 | Rackley, III et al. | |
| 2010/0070412 A1 * | 3/2010 | Stanley .................. | G06Q 20/10 |
| | | | 705/43 |
| 2010/0235283 A1 * | 9/2010 | Gerson .................. | G06Q 40/04 |
| | | | 705/75 |
| 2010/0250410 A1 | 9/2010 | Song et al. | |
| 2011/0238573 A1 * | 9/2011 | Varadarajan ....... | G06Q 20/1085 |
| | | | 705/43 |
| 2012/0160912 A1 * | 6/2012 | Laracey ................. | G06F 21/43 |
| | | | 235/379 |
| 2012/0303528 A1 * | 11/2012 | Weiner .................... | G06Q 20/32 |
| | | | 705/44 |
| 2013/0124411 A1 * | 5/2013 | Kobres .................. | G07F 19/20 |
| | | | 705/43 |
| 2013/0124855 A1 | 5/2013 | Varadarajan et al. | |
| 2013/0238497 A1 * | 9/2013 | Ramachandran ...... | G06Q 20/40 |
| | | | 705/41 |
| 2014/0046842 A1 * | 2/2014 | Irudayam ........... | G06Q 20/3223 |
| | | | 705/43 |
| 2014/0172703 A1 * | 6/2014 | Black ..................... | G07F 19/20 |
| | | | 705/43 |
| 2014/0263618 A1 * | 9/2014 | McCarthy .............. | G06Q 40/02 |
| | | | 235/379 |
| 2015/0019944 A1 * | 1/2015 | Kalgi .................... | G06F 16/958 |
| | | | 715/205 |

FOREIGN PATENT DOCUMENTS

| | | | | |
|---|---|---|---|---|
| WO | WO-2013045898 A2 * | 4/2013 | ......... | G06Q 20/3829 |
| WO | WO-2014013071 A1 * | 1/2014 | ............ | G06Q 20/10 |

OTHER PUBLICATIONS

Intellectual Property Office of Singapore Search Report and Written Opinion, dated Jun. 15, 2017, for corresponding Singapore Application No. 11201609361P.

* cited by examiner

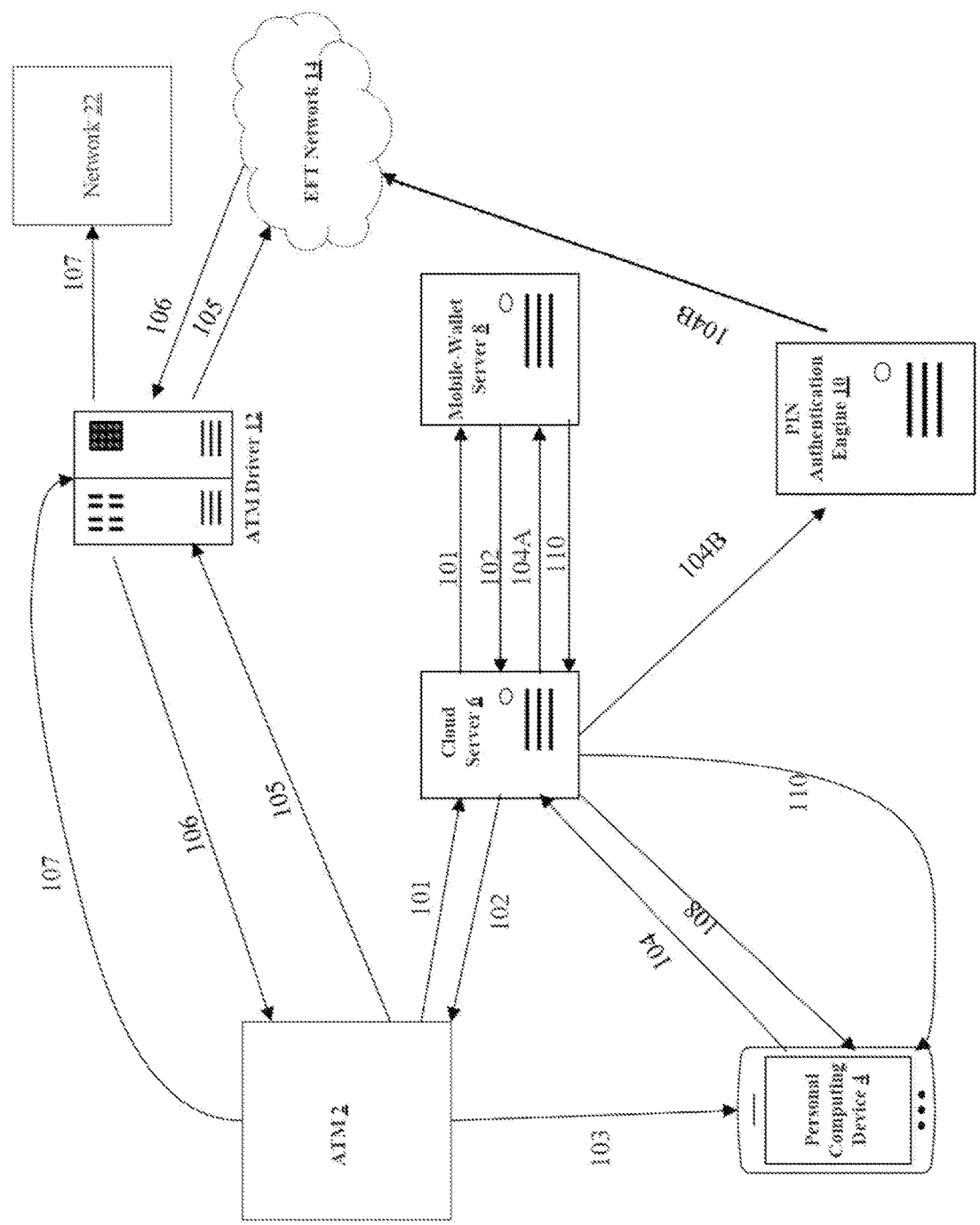

CARDLESS FINANCIAL TRANSACTIONS

PRIORITY CLAIM

This patent application claims priority to U.S. provisional patent application Ser. No. 61/990,946 filed on May 9, 2014. This application also claims priority to PCT application PCT/US15/030174 filed on May 11, 2015. The subject matter of both applications is hereby incorporated by reference.

BACKGROUND OF THE INVENTION

There remains a need in the art for cardless ATM transactions and related methods.

BRIEF DESCRIPTION OF THE SEVERAL VIEWS OF THE DRAWINGS

FIG. 4 is a flow diagram showing a universal overview of an embodiment for performing a cardless ATM transaction.

DETAILED DESCRIPTION OF THE INVENTION

Generally provided is a cardless ATM transaction driven by inputs from both 1) a personal computing device, and 2) an ATM. In embodiments, inputs from a personal computing device are used to create data set(s) that are subsequently used to drive an ATM transaction in a similar fashion to the dataset(s) created from a traditional debit card when inserted into an ATM to initiate an ATM transaction. As a result, embodiments allow for a cardless ATM transaction to be performed.

Method and system embodiments are directed to: 1) creating a mobile-wallet data set, and 2) executing an ATM transaction using the mobile-wallet data set. Embodiments are generally described in the context of computer-readable logic executed by one or more general-purpose computers. For example, in a portion of an embodiment, computer readable logic is stored on a server computer system and accessed by a client computer via a communications link or a network, such as an intranet, Internet, virtual private network, or another computer network. And because the basic structures and functions related to computer-readable routines and corresponding implementations are known, they have not been shown or described in detail below to avoid unnecessarily obscuring the described embodiments.

Details are set forth in the following description and in FIGS. 1-4 to provide a thorough understanding of various embodiments of the invention. Those of ordinary skill in the art will understand that the invention may have additional embodiments that may be practiced without several of the details described below. In some instances, persons of ordinary skill in the art will appreciate that the methods and systems described herein can include additional details without departing from the spirit or scope of the disclosed embodiments. Additionally, some known structures and systems associated with automated teller machines (ATMs), mobile devices, and associated computer networks have not been shown or described in detail below to avoid unnecessarily obscuring the described embodiments.

In the following figures, identical reference numbers identify identical or at least generally similar elements. In the flow diagrams, a rectangle represents a process, task, action, or operation; a diamond presents a question; and a parallelogram shows input or output.

Figure 1:
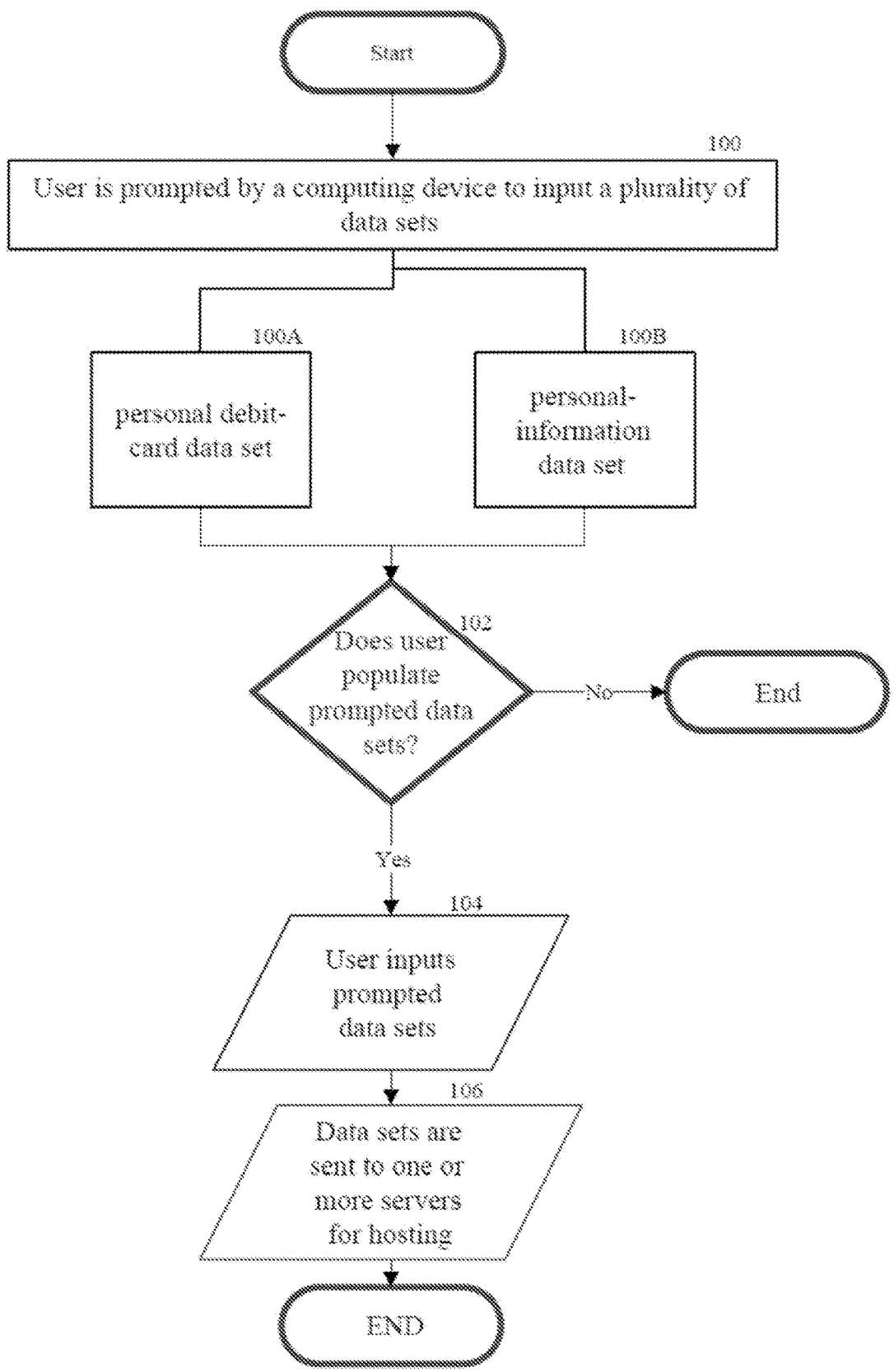
FIG. 1 is a flow diagram showing an embodiment for creating a mobile-wallet data set.

FIG. 1 is a flow diagram showing an embodiment of how a user can create mobile-wallet data set by using personal computing device 4, e.g., a computing tablet or mobile phone, to input a plurality of required data sets that together make up mobile-wallet data set. Mobile-wallet data set is a collection of one or more electronic data sets that may include at least one personal debit-card data set 18, e.g., a data set that provides debit-card number, CVV number, and expiration-date information, and at least one personal-information data set 20, e.g., cardholder name. In an embodiment, mobile-wallet data set may include a data set associated with a credit or debit card distinct from personal debit-card data set 18 mentioned above. Block 100 shows a user being prompted to create mobile-wallet data set by using personal computing device 4 to input a plurality of data sets that include 1) personal debit-card data set 18, and 2) personal-information data set 20, shown respectively in blocks 100A and 100B. In decision block 102, the user is shown as having to decide whether to input the prompted data sets, i.e., personal debit-card data set 18 and personal-information data set 20. Block 104 shows the user inputting the requested data sets by populating the data fields prompted to the user; these combined requested data sets make up mobile-wallet data set. In response to populating the prompted data fields, block 106 shows computing device 4 sending mobile-wallet data set to server 6 that then forwards mobile-wallet data set to mobile-wallet server 8 for hosting.

In an embodiment, personal computing device 4 sends mobile-wallet data set to server 6 that then forwards mobile-wallet data set to server 8 for hosting. In another embodiment, computing device 4 sends mobile-wallet data set to server 6 that executes an algorithm on at least a portion of mobile-wallet data set and thereby determines the appropriate host-server destination for mobile-wallet data set. In response to reaching this algorithm-driven-host-server-destination determination, mobile-wallet data set is then forwarded from server 8 to the identified host-server destination from amongst a plurality of host servers. In an embodiment, server 6 may have a plurality of host-server destinations to select from, wherein the plurality of host-server destinations are specific as to the type of mobile-wallet data set that they each respectively host. In other words, each host-server destination (i.e., host server) may respectively host different types of mobile-wallet data set(s). Mobile-wallet data set may include data that the algorithm (performed on server 6) determines is associated with a specific banking institution, and in response to reaching this determination, causes mobile-wallet data set to be forwarded from server 6 to the dedicated host server for that specific bank or bank data. As an illustrative example, mobile-wallet data set relating to ABC bank is sent from server 6 to a host server dedicated to hosting ABC-bank mobile-wallet data sets; mobile-wallet data set relating to DEF bank is sent from server 6 to a host server dedicated to hosting DEF-bank mobile-wallet data sets; mobile-wallet data set relating to MI bank is sent from server 6 to a host server dedicated to hosting GHI-bank mobile-wallet data sets; and so on.

Figure 2:
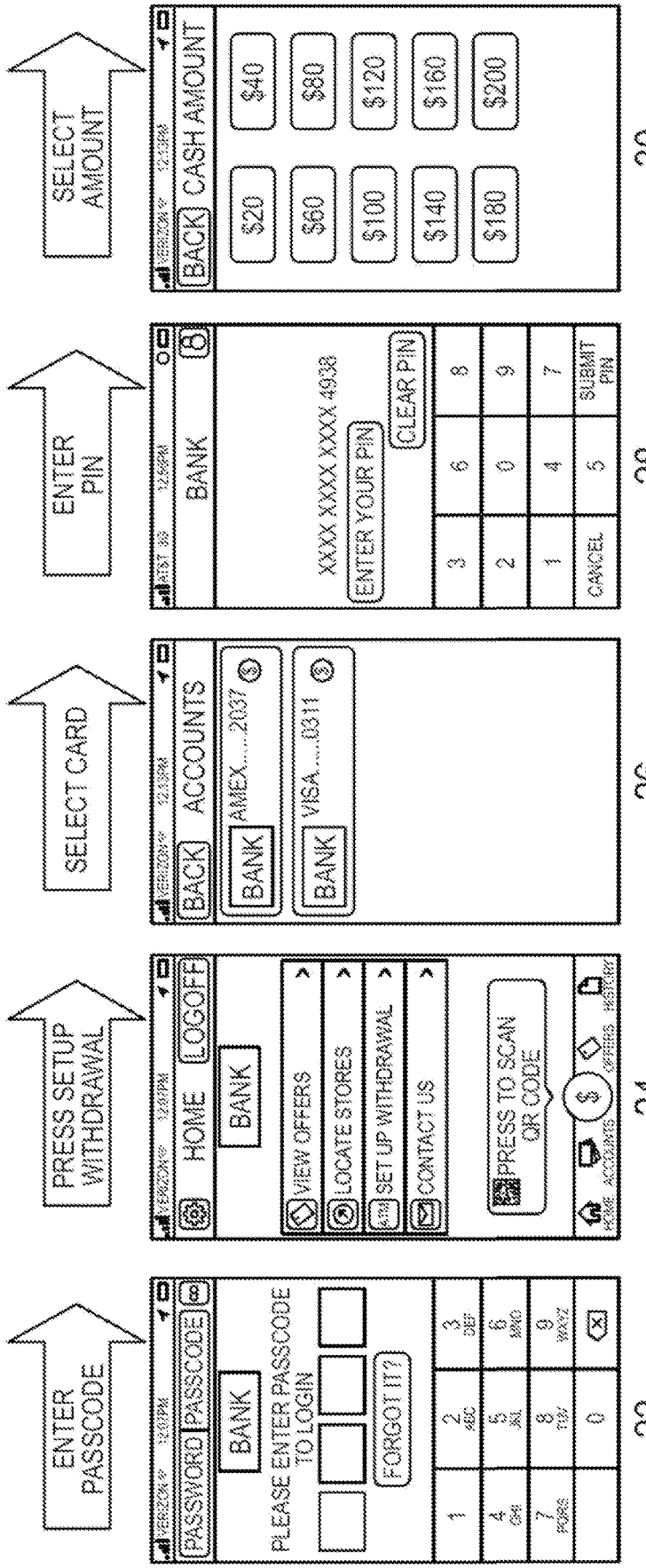
FIG. 2 illustrates an embodiment for pre-staging a cardless ATM transaction using a personal computing device.

FIG. 2 illustrates an embodiment for pre-staging a cardless ATM transaction using personal computing device 4.

More specifically, FIG. 2 illustrates a graphical-user-interface (GUI) flow diagram, depicted as it would be displayed on personal computing device 4, for pre-staging an ATM transaction.

In an embodiment, a mobile-cash-access app is launched on personal computing device 4, and "password/passcode" data-entry page 22 is displayed on personal computing device 4's touchscreen GUI. In response to entering an acceptable password/passcode, "home" page 24 is subsequently displayed on personal computing device 4's touchscreen GUI. In response to selecting "set up withdrawal" displayed on "home" page 24 on the touchsceen GUI, "accounts" page 26 is subsequently displayed on personal computing device 4's touchscreen GUI. In response to selecting the card image on the touchscreen GUI that represents the account and desired mobile data set to be used in the transaction, "PIN" page 28 is subsequently displayed on personal computing device 4's touchscreen GUI. In response to entering the correct PIN associated with the account and desired mobile data set to be used in the transaction, "cash amount" page 30 is subsequently displayed on personal computing device 4's touchscreen GUI. In response to selecting a cash amount on personal computing device 4's touchscreen GUI, pre-staging of the cardless ATM transaction using personal computing device 4 is complete.

Figure 3:
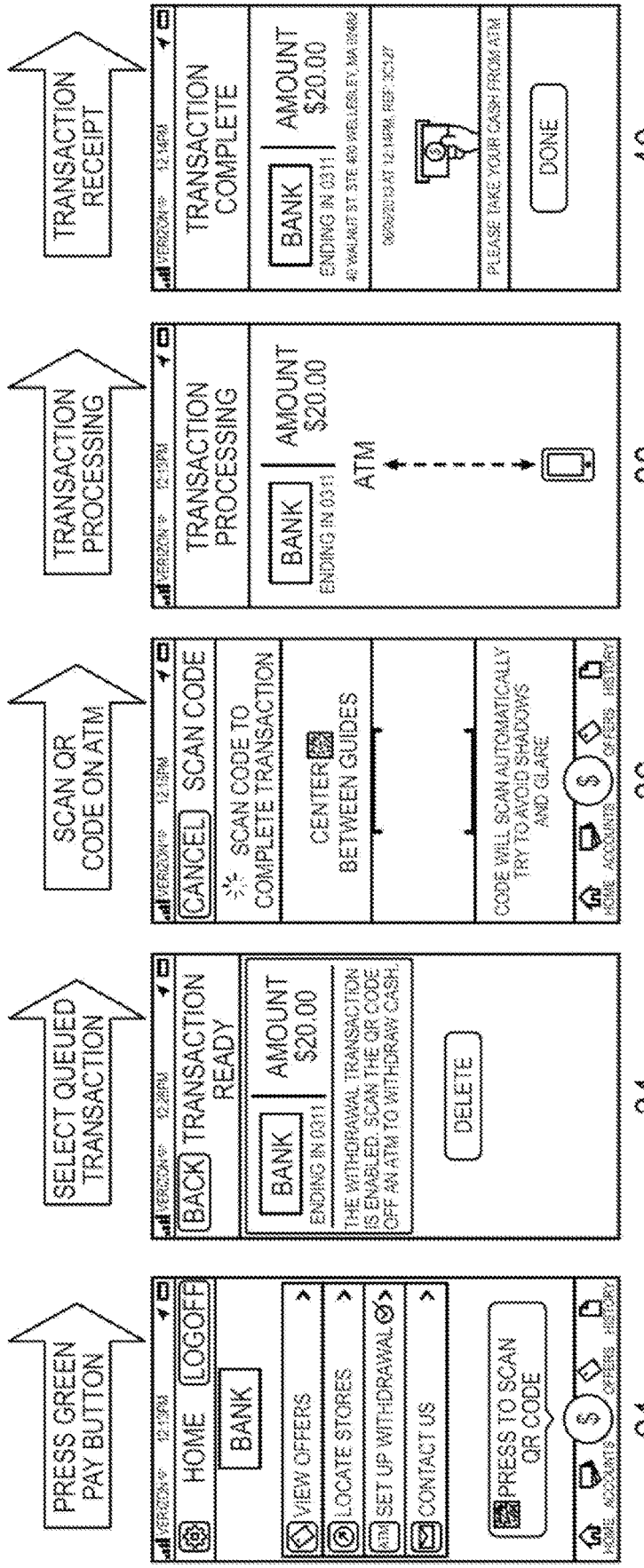
FIG. 3 illustrates an embodiment for performing a cardless ATM transaction using a personal computing device in coordination with an ATM.

FIG. 3 illustrates an embodiment for performing a cardless ATM transaction using personal computing device 4 in coordination with ATM 2. More specifically, FIG. 3 illustrates a graphical-user-interface (GUI) flow diagram depicted as it would be displayed on personal computing device 4 at the time of performing a cardless ATM transaction using personal computing device 4 in coordination with ATM 2.

In an embodiment, "home screen" 24 is displayed on personal computing device 4's touchscreen GUI. In response to selecting the "pay" button on "home screen" page 24, "select queued transaction" page 34 is subsequently displayed on personal computing device 4's touchscreen GUI. In response to selecting the desired queued transaction, "scan code" page 36 is subsequently displayed on personal computing device 4's touchscreen GUI. In response to personal computing device 4 scanning the two-dimensional data code such as the QR CODE® displayed on ATM 2's GUI interface "transaction processing" page 38 is subsequently displayed on personal computing device 4's touchscreen GUI. In response to the ATM transaction being complete, "transaction complete" page 40 is subsequently displayed on personal computing device 4's touchscreen GUI.

FIG. 4 is a flow diagram showing a universal overview of an embodiment for performing a cardless ATM transaction. In FIG. 4, consumer uses the GUI interface of ATM 2 to initiate a cardless ATM transaction. ATM 2, that is configured to receive and execute the "initiate-a-cardless-ATM-transaction" command, responds to the command by sending client request 101 to mobile-wallet server 8 (that hosts mobile-wallet data set) via cloud server 6. In response to receiving client request 101, mobile-wallet server 8 generates and sends a token, e.g. a QR CODE®, response 102 back to ATM 2 via cloud server 6 using a virtual-private-network (VPN) connection. In response to receiving the token/QR CODE® back from server 8, ATM 2 displays the token/QR CODE® on its GUI interface to be scanned by personal computing device 4. Consumer opens mobile-cash-access app on personal computing device 4 and captures the token by scanning the token displayed on ATM 2's GUI interface. Capturing of the token by personal computing device 4 is shown as data transfer 103. In response to personal computing device 4 capturing the token, personal computing device 4 subsequently sends token data, that includes at least a portion of mobile-wallet data set, to both mobile-wallet server 8 and PIN authentication engine server 10 (via server 6); these data transfers are shown as 104a and 104b respectively.

Regarding data-transfer 104a, in response to receiving token-data transfer 104a, mobile-wallet server 8 executes an algorithm that i) validates the authenticity of personal computing device 4, ii) validates the authenticity of the mobile-cash-access app running on personal computing device 4, iii) validates the app passcode entered by the consumer, and iv) validates the token. In response to validating these items, mobile-wallet server 8 sends available consumer financial accounts to personal computing device 4 shown as data transfer 110. In response to receiving available consumer financial accounts, personal computing device 4 displays the available consumer financial accounts on the GUI of personal computing device 4; an illustrative embodiment of this is shown on webpage 26 of FIG. 2. Consumer then selects a consumer financial account from those displayed on personal computing device 4. In an embodiment, the amount of the transaction is not pre-staged and the amount of the transaction must be entered into either ATM 2 or personal computing device 4.

Regarding data transfer 104b from personal computing device 4 to PIN authentication engine server 10, in response to receiving data transfer 104b, PIN authentication engine server 10 then forwards at least a portion of data transfer 104b to EFT network and issuer for PIN authentication purposes. In an alternate embodiment, in addition to receiving token-data transfer 104b, an embodiment has PIN authentication engine server 10 also receiving the consumer's PIN data entry that has been entered by the consumer into ATM 2 or personal computing device 4.

Data transfer 105 represents the i) card number, ii) PIN, and iii) transaction data set being sent from ATM 2 to EFT network 14 via ATM driver 12. Data transfer 105 is sent to EFT network in order to receive authorization to execute the transaction. Upon authorizing the transaction (based at least in part on the data provided by data transfer 104b), EFT network 14 sends authorization data set 106 to ATM 2 via ATM driver 12. The transaction is then authorized and settlement occurs as is commonly known in the ATM industry and is represented as data transfer 107. A digital receipt is then delivered to personal computing device 2 from cloud server 6 as shown by data transfer 108.

Persons of ordinary skill in the art will appreciate that changes could be made to the embodiments described above without departing from the broad inventive concepts thereof. It is to be understood, therefore, that this invention is not limited to the particular embodiments disclosed, but it is intended to cover modifications within the spirit and scope of the present invention as defined by the appended claim.

What is claimed is:

1. A method comprising:
 receiving, with a banking computer system of a banking institution, a queue of pre-staged automatic-teller-machine (ATM) transactions created by a banking customer using a personal computing device communicating with the banking computer system, each pre-staged ATM transaction in the queue of pre-staged ATM transactions comprising a data set that identifies a type of transaction to be executed, a data set that identifies a mobile-wallet data set to be used for performing the transaction, and a data set that identifies a personal identification number (PIN) associated with the identified mobile-wallet data set;

displaying, on a graphical-user-interface (GUI) of the personal computing device, the queue of pre-staged ATM transactions;

performing a cardless ATM transaction, with a personal computing device in coordination with the ATM, before processing any of the pre-staged ATM transactions in the queue of pre-staged ATM transactions including:

receiving, with the banking computer system, data from the personal computing device as a result of the banking customer using the personal computing device to select one pre-staged ATM transaction in the queue of pre-staged ATM transactions displayed on the GUI of the personal computing device;

displaying, with a GUI of the ATM, a two-dimensional bar code in response to receiving a command through a GUI of the ATM when the GUI is used by the banking customer; and capturing, with the personal computing device, the two-dimensional bar code only after said receiving the data from the personal computing device resulting from the banking customer using the personal computing device to select the one pre-staged ATM transaction;

executing, with the ATM, the selected pre-staged ATM transaction after said receiving data from the personal computing device with the banking computer system and after said capturing;

hosting the mobile-wallet data set with a mobile-wallet server of the banking computer system, wherein the mobile-wallet data set includes one or more electronic data sets that includes at least one personal debit-card data set having a card number and at least one personal-information data set including a name of the banking customer;

receiving, through a GUI of the ATM, a transaction command from the banking customer;

transmitting, with the ATM, after said receiving the transaction command, the transaction command to a cloud server of the banking computer system; and transmitting, with the cloud server, the transaction command to the mobile-wallet server.

\* \* \* \* \*